J. CASE.
Corn-Planters.

No. 145,396. Patented Dec. 9, 1873.

Witnesses.
Harry King.
H. W. Dodge.

Inventor.
Jarvis Case
by Dodge & Son
attys.

2 Sheets--Sheet 2.
J. CASE.
Corn-Planters.
No. 145,396.           Patented Dec. 9, 1873.
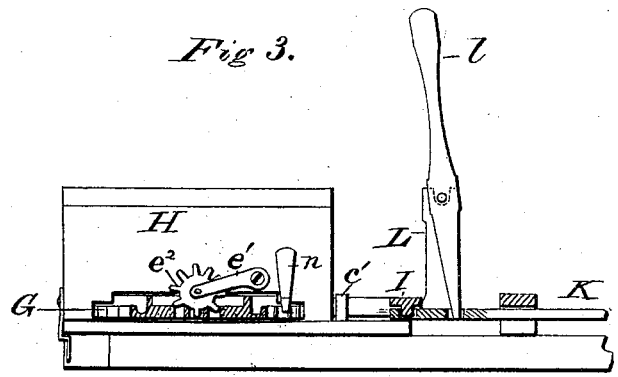
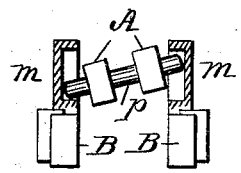
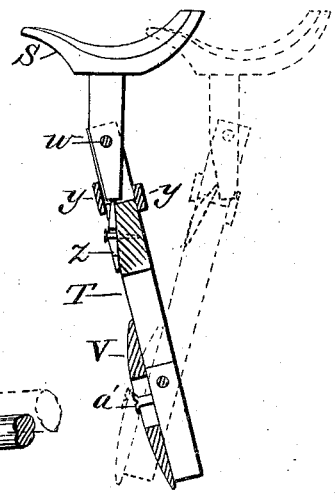
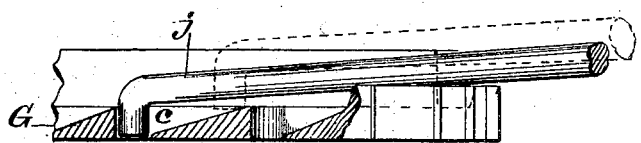
Witnesses.
Harry King
H. W. Dodge
Inventor.
Jarvis Case,
by Dodge & Son
Attys.

UNITED STATES PATENT OFFICE.

JARVIS CASE, OF SPRINGFIELD, OHIO.

IMPROVEMENT IN CORN-PLANTERS.

Specification forming part of Letters Patent No. 145,396, dated December 9, 1873; application filed November 15, 1873.

*To all whom it may concern:*

Be it known that I, JARVIS CASE, of Springfield, in the county of Clarke and State of Ohio, have invented certain Improvements in Corn-Planters, of which the following is a specification:

My invention relates to that class of corn-planters which use a front frame mounted on runners and a rear frame mounted on wheels, usually called two-horse planters; and the invention consists in an improved mechanism for dropping the seed, a peculiar style of flexible joint for connecting the front and rear frames, novel means for adjusting the depth of the runners and raising the front frame, a method of adjusting the seat, and a spring-scraper, all as hereinafter explained.

Figure 1:
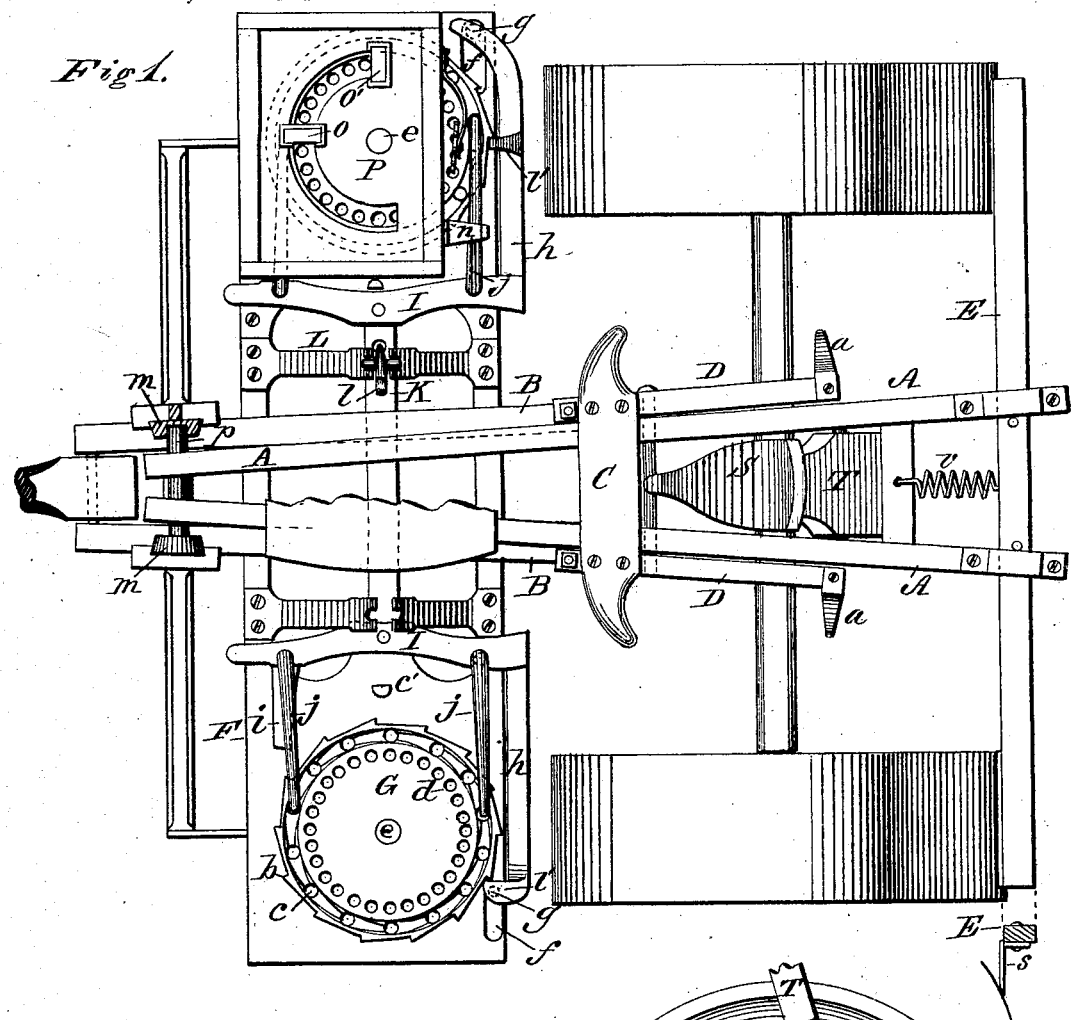
Figure 2:
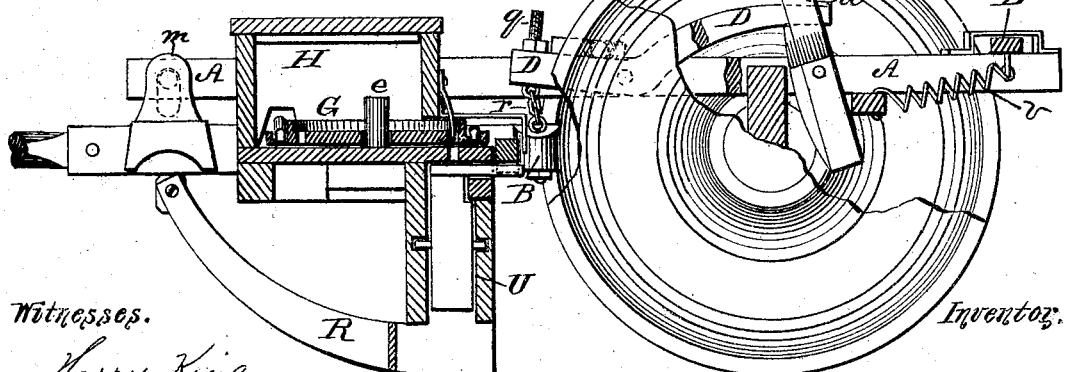

Figure 1 is a top-plan view; Fig. 2, a longitudinal section taken through one of the hoppers; Fig. 3, a rear elevation of one of the hoppers with its mechanism; and Figs. 4, 5, and 6, views of portions shown in detail.

In constructing my planter, I make a rear frame, consisting of an axle mounted on two wheels, with two bars, A, rigidly attached, and extending to the front end of the runner-frame, to which they are attached, as represented in Figs. 1, 2, and 4. As shown, there are two bars, B, rigidly attached to the front frame, and at their front ends are bolted two uprights or plates, $m$, each having on its inner face a vertical recess, as represented in dotted lines in Fig. 2, and in section in Fig. 4, in which recesses the ends of a bolt, $p$, rest, this bolt passing transversely through the front ends of the bars A, by which means there is secured a flexible joint, that permits the two frames to adjust themselves independently to the irregularities of the surface. The bars B also extend back in rear of the front frame, and at their rear ends are connected, by short chains $r$, Fig. 2, and an eye-bolt, $q$, to the front end of bars D, which are pivoted to the sides of the bars A, (see Figs. 1 and 2,) and are provided at their rear ends with projections $a$ for the driver's feet. Near their front ends these bars D are rigidly connected by a cross-bar, C, the ends of which project beyond the bars, as shown in Fig. 1, forming rests for the driver's feet.

By means of the chains and eyebolts the front frame can be adjusted, in relation to the rear frame, so as to run more or less deep, and by the levers D the front frame can be raised clear of the ground in turning around.

The seat S is supported on a jointed bar or support, T, shown in detail in Fig. 1, which bar is pivoted between the bars A a short distance in rear of the axle, so that it can be swung forward and made to rest against the axle, as shown by the full lines in Fig. 5, or be swung back, as represented by the dotted lines.

In order to regulate the position of the seat I attach to the front side of the standard T a sliding piece, V, made wedge-shaped at each end, it being held by a screw or bolt, $a'$, so that the piece V can be adjusted up or down on the standard T, and thus regulate the inclination at which it shall stand both when forward and when back. As shown in Fig. 5, there is a joint near the upper end of the standard T, thus permitting the seat S to tip so as to remain in a horizontal position whichever way the standard is inclined. A sliding wedge, $z$, is secured by a bolt to the front of the standard T below its joint, so that, by slipping it up between the cross-piece $y$ and the part attached to the seat, the latter can be locked rigidly in place.

In order to keep the wheels from becoming clogged with dirt, I arrange a bar, E, transversely in rear of the wheels, as shown in Figs. 1 and 2, having scrapers $s$ attached, and to hold these in contact with the wheels, I attach to the bar a spring, $v$, which is arranged to be disconnected when desired.

The planting or dropping mechanism proper is mounted on the front frame and arranged to pass the seed from the hopper H through tubes U in the heels of the runners R, in the usual manner. This mechanism consists of a disk-plate, G, located at the bottom of the hopper, and held in place by a stud or pin, $e$, around which it is made to revolve in a horizontal plane.

In Fig. 1 one of these disks is shown with the hopper and other parts removed, and, as there shown, it is provided on its periphery with a series of ratchet-teeth, and on its face with a circular groove, in which are formed another series of ratchet-teeth, each terminating with a hole, c, these being best seen in Fig. 6. Inside of these is a row of holes, d, which constitute the seed cups or cells, and through which the seed passes, as usual, into the tubes U.

To operate these disks I provide a yoke, I, which has a long arm, h, on the rear, and a short arm, i, at the front, as shown in Fig. 1, the arm h having, at its extremity, a pin, g, that works in a slot, f, in the bed-plate, thus causing the yoke to move in a straight line, and also limiting its movements. To this yoke is pivoted loosely two rods, j, the opposite ends of which project over the disk G, and, being bent at right angles at their extremities, rest in the circular groove and engage with the ratchet-teeth upon the upper face of the plate, as shown clearly in Fig. 6. As these rods are located at opposite sides, it follows that as the yoke is moved in one direction the rod j at one side moves the disk G, while the rod at the opposite side rides up the inclined face of a tooth at that side, and as the motion of the yoke is reversed the latter rod shoves the disk on in the same direction, the first rod j then riding up over a tooth on its side.

It will be observed that there are twice as many seed-cells in the plate G as there are ratchet-teeth in either row; and thus, when the yoke I is moved in either direction, it is required to be moved but half the distance from one ratchet-tooth, c, to the next, because while the rod j is advancing toward the tooth the latter is, at the same time, advancing to meet it, and thus the yoke is required to move only half the distance between the ratchet-teeth, in order to bring the seed-cells successively into the required position to drop the seed into the tube U below. This decreased movement of the yoke, of course, lessens to a corresponding extent the distance that the hand-lever l has to be moved, and thus the labor of the dropper is greatly lessened, for, although he has the same number of motions to make in order to plant a given number of hills, he has but half the distance through which to continue the motion that is required in ordinary machines working on this plan.

In order to prevent the disks from moving too far, the end of arm i is arranged to come just in front of one of the teeth b, and act as a stop when the yoke is moved in one direction, while a lug, l', on the arm h, serves, in like manner, as a stop when the yoke moves in the opposite direction. There is a yoke, I, for each hopper, and they are connected by a bar, K, which has a hole on each side of the dropper's seat for a lever, l, so the yokes and their attachments can be operated by either hand, this lever l being pivoted loosely in standards L upon the front frame, as shown in Figs. 1 and 3. In order to enable the dropper to see whether the cells are properly filled with seed, I arrange the disks G so they will protrude through an opening in the rear side of the hopper, as shown in Figs. 1 and 3; and to the rear side of the hopper I pivot loosely a short metal bar, $e^1$, which has a sprocket-wheel, $e^2$, pivoted to the loose end of the bar $e^1$, with its teeth of such size and distance apart that one shall enter each cell as the disk revolves. In each hopper, over the disk G, I place a plate, P, Fig. 1, which has a semicircular opening in it for the grain to pass down and enter the cells in the disk below; and to this plate, which is set loosely in the hopper, I secure two cut-offs, o and o', so that, if the first fails to act perfectly, the second will complete the operation, and thus insure the depositing of no more than the required quantity of seed.

By these several improvements I produce a planter that is very perfect in its operation, and not liable to get out of order.

I am aware that disks have before been used to measure and drop seed; but in all cases they have been operated by spring ratchets or arms; or if by rigid arms, these latter have had a lateral as well as a to-and-fro movement, rendering the mechanism more complicated, and liable to derangement.

By my plan, it will be seen that the yoke and its operating devices have simply a to-and-fro movement, and that no springs are used, my rods j, which move the disks, being held down and made to engage with the teeth upon the face of the disks G by gravity alone.

Having thus described my invention, what I claim is—

1. The rotating plate G, provided with the seed-cells d and the ratchet-teeth c on its face, in combination with the rods j, said parts being constructed and arranged to operate as and for the purpose set forth.

2. The disk G, provided with the teeth b on its edge, in combination with the arms h and i, arranged to operate as stops to limit the motion of the disks, as set forth.

3. The plates m, provided with vertical recesses or slots, in combination with the pin p, when applied as described, to form a flexible joint between the front and rear frames of a planter.

4. The levers D, pivoted to the bars A of the rear frame, and connected, by means of the chains r and adjusting-bolts q, to the rear end of the front frame, for the purpose of elevating and adjusting the latter, all combined and operating as set forth.

5. The pivoted standard T, having the seat S' made adjustable thereon, and provided with the adjustable wedges V and z and bars y, all constructed and arranged to operate substantially as described, whereby the seat can be moved forward or back, and kept in a horizontal position, as set forth.

6. In a corn-planter, the bar provided with the scrapers, in combination with the central detachable spring, all constructed and arranged to operate as set forth.

JARVIS CASE.

Witnesses:
W. C. DODGE,
W. W. DODGE.